United States Patent
Pietsch

(10) Patent No.: US 11,161,647 B2
(45) Date of Patent: Nov. 2, 2021

(54) TRANSPORT SKID

(71) Applicants: Mohr Lizenz Verwaltungs GmbH, Bielefeld (DE); Uwe Pietsch, Grenzach-Wyhlen (DE); Ulrich Meloh, Hameln (DE)

(72) Inventor: Uwe Pietsch, Grenzach-Wyhlen (DE)

(73) Assignees: Mohr Lizenz Verwaltungs GmbH, Bielefeld (DE); Ulrich Meloh, Hamelin (DE)

( * ) Notice: Subject to any disclaimer, the term of this patent is extended or adjusted under 35 U.S.C. 154(b) by 0 days.

(21) Appl. No.: 16/836,009

(22) Filed: Mar. 31, 2020

(65) Prior Publication Data
US 2020/0331658 A1  Oct. 22, 2020

(30) Foreign Application Priority Data
Apr. 17, 2019 (EP) ..................................... 19169773

(51) Int. Cl.
| | |
|---|---|
| *B62D 65/18* | (2006.01) |
| *B65D 19/00* | (2006.01) |
| *B65D 19/44* | (2006.01) |
| *B65D 65/02* | (2006.01) |
| *B62D 65/02* | (2006.01) |

(52) U.S. Cl.
CPC ....... *B65D 19/0097* (2013.01); *B62D 65/026* (2013.01); *B62D 65/18* (2013.01); *B65D 19/44* (2013.01); *B65D 65/02* (2013.01); *B65D 2519/00024* (2013.01); *B65D 2519/00572* (2013.01)

(58) Field of Classification Search
CPC ...... B65D 19/0097; B65D 2519/00024; B65D 2519/00572
See application file for complete search history.

(56) References Cited

U.S. PATENT DOCUMENTS

| | | | | |
|---|---|---|---|---|
| 2,359,406 | A * | 10/1944 | Grosser .................. | B65D 19/44 108/55.5 |
| 8,268,150 | B2 * | 9/2012 | Weschke ................ | C25D 13/22 204/512 |
| 2004/0084590 | A1 * | 5/2004 | Dorrian .................. | B62D 65/02 248/300 |

* cited by examiner

*Primary Examiner* — Jason L Vaughan
*Assistant Examiner* — Amanda Kreiling
(74) *Attorney, Agent, or Firm* — Laurence P. Colton; Smith Tempel Blaha LLC

(57) ABSTRACT

A transport skid for transporting vehicles or vehicle parts through assembly lines in a transport direction comprises two interconnected longitudinal members that extend such that the main longitudinal extension direction thereof is in parallel with the transport direction. The longitudinal members are interconnected by means of transverse connectors that are mutually spaced in the transport direction, first receptacles for placing a vehicle or vehicle part being attached to the longitudinal members. The longitudinal members and the transverse connectors and the first receptacles comprise structural profiles, in particular metal profiles or composite material profiles, structural profiles of the transverse connectors and of the first receptacles being connected to the structural profiles of longitudinal members by means of a screw connection.

35 Claims, 1 Drawing Sheet

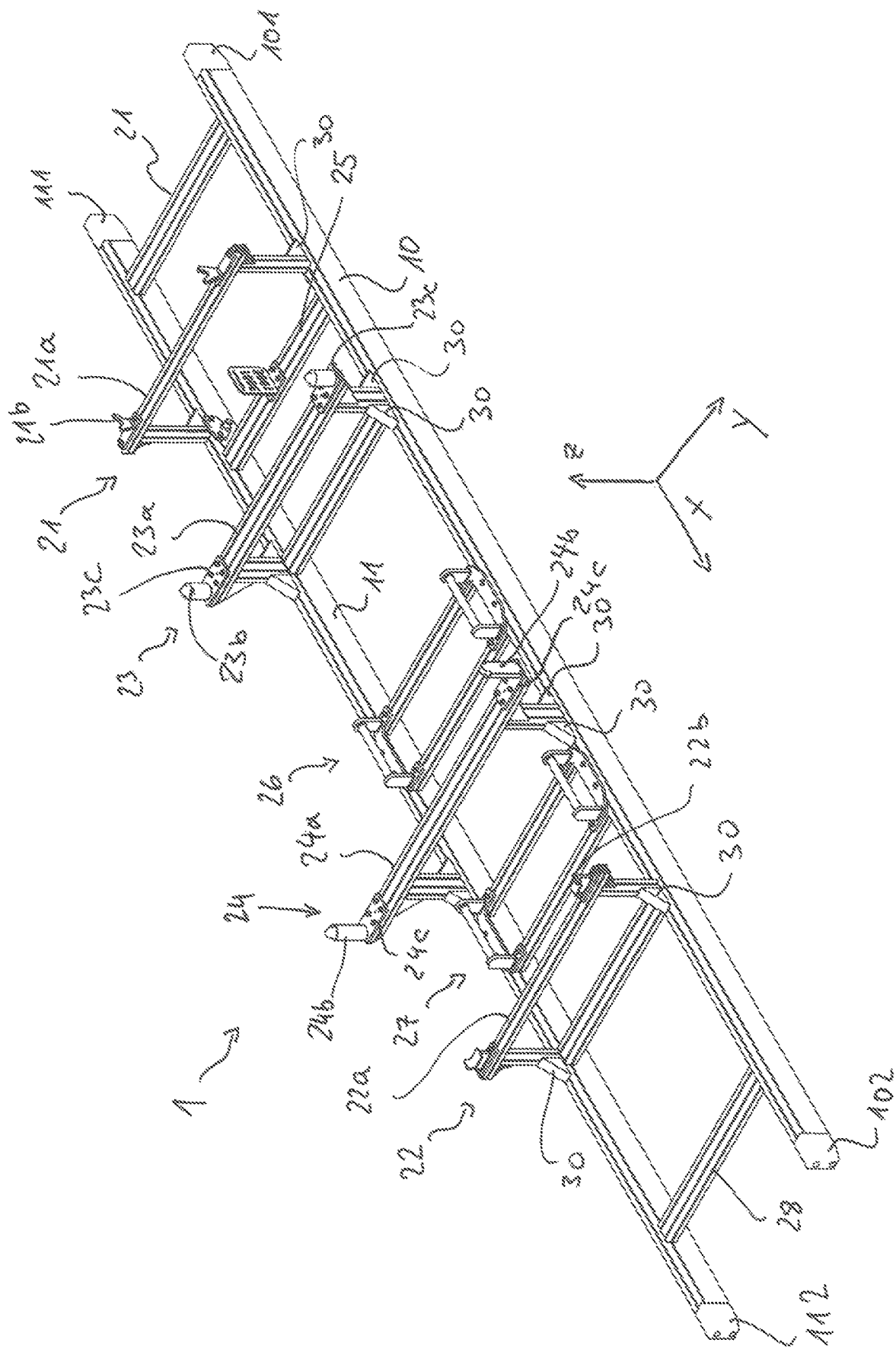

TRANSPORT SKID

CROSS REFERENCE TO RELATED APPLICATIONS

This patent application claims priority on and the benefit of European Patent Application No. 19169773.9 having a filing date of 17 Apr. 2019.

BACKGROUND OF THE INVENTION

Technical Field

The invention relates to a transport skid for transporting vehicles or vehicle parts through assembly lines in a transport direction, comprising two interconnected longitudinal members that extend such that the main longitudinal extension direction thereof is in parallel with the transport direction, the longitudinal members being interconnected by means of transverse connectors that are mutually spaced in the transport direction, first receptacles for placing a vehicle or vehicle part being attached to the longitudinal members.

Prior Art

In the global automotive industry, components such as engines, bodies and other workpieces are moved through the production facility on skid frameworks, known as transport skids, comprising roller tracks and other continuous conveyors. This type of conveying technology is found in all regions of a car factory. They are used in anything from shell construction, to painting facilities, to final installation. It is entirely possible for over 1000 transport skids of this kind to be used in one factory. Owing to the different dimensions and weights of the vehicles, the transport skids have to be designed individually for the different model ranges of the individual makes of car. Formerly, car manufacturers brought a new model onto the market approximately every 72 months, but today this takes place substantially more frequently. In addition, owing to the size thereof (e.g. SUV) and the new electric powertrains, the vehicles are becoming increasingly heavy. As a result, existing conveying mechanisms are reaching the limits of their capacity, and the energy consumption increases accordingly.

Nowadays, transport skids are usually made of steel, as a weldment. A disadvantage in this case is the high dead load of steel skids of this kind. Said skids then have to be adjusted in the case of a change of model. For this purpose, the transport skids are cut apart, and welded together again in accordance with the new specifications. The welding process often leads to thermoelectric tensions which then require complex adjustment and subsequent tensionless annealing. This heat treatment damages the paintwork, and therefore the transport skids have to be pretreated for a new paint finish. This is achieved by sandblasting or grinding. The repainting is carried out subsequently.

This process is very laborious.

BRIEF SUMMARY OF THE INVENTION

The object of the present invention is therefore that of providing a transport skid of the type mentioned at the outset, by means of which it is possible to prevent the disadvantages set out above.

This object is achieved by a transport skid for transporting vehicles or vehicle parts through assembly lines in a transport direction, comprising two interconnected longitudinal members that extend such that the main longitudinal extension direction thereof is in parallel with the transport direction, the longitudinal members being interconnected by means of transverse connectors that are mutually spaced in the transport direction, first receptacles for placing a vehicle or vehicle part being attached to the longitudinal members, characterized in that the longitudinal members and the transverse connectors and the first receptacles comprise structural profiles, in particular metal profiles or composite material profiles, structural profiles of the transverse connectors and of the first receptacles being connected to the structural profiles of longitudinal members by means of a screw connection. Advantageous embodiments can be found in the dependent claims.

The invention is based on the concept of providing a transport skid which is designed as a screwed construction. Compared with conventional welded transport skids, transport skids according to the invention can be adjusted without significant outlay, for example in the case of a change of model or changes of the goods to be transported, it being possible for principle assemblies to optionally be used unamended. Furthermore, the high requirements for the dimensional accuracy of the vehicle or part receptacles on the transport skid can be met, since complex adjustment, and thermal tensions in the material, brought about by the welding process, are avoided. Furthermore, a further surface coating or painting is avoided.

For this purpose, according to the invention a transport skid for transporting vehicles or vehicle parts through assembly lines, in a transport direction, is provided, which skid comprises two interconnected longitudinal members that extend such that the main longitudinal extension direction thereof is in parallel with the transport direction. Said members are interconnected by means of transverse connectors. In this case, according to the invention, the longitudinal members and the transverse connectors and the first receptacles comprise structural profiles. Said structural profiles may be metal profiles, in particular aluminum profiles, but also those made of composite material, in particular lightweight composite material. The structural profiles of the transverse connectors and of the first receptacles are connected to the structural profiles of longitudinal members by means of a screw connection. In particular, the members or longitudinal members function as runners for the transport skid.

In addition to the first receptacles which are used for example for receiving workpieces to be transported, according to a preferred embodiment the transport skid may comprise structural profiles comprising second receptacles for receiving a further transport skid. In this way, it is possible to stack a plurality of transport skids. In this case, in particular structural profiles of the second receptacles are connected to the structural profiles of the longitudinal members by means of a screw connection.

According to a further embodiment according to the invention, it may be possible for at least one first and/or second receptacle to be designed so as to be foldable relative to the members. The folding makes it possible for the transport skids to be stored in an even more space-saving manner. It may furthermore be possible for the mentioned receptacles to be fastened to base plates, in particular those made of aluminum. The receptacles can then be screwed as a whole to the longitudinal members. This makes it possible to adjust the receptacles in a stepless manner, which further significantly increases the flexibility of the transport skid according to the invention.

It is particularly advantageous for at least one of the metal profiles to be an aluminum profile or a composite material profile, in particular lightweight composite material. Preferably, all the structural profiles used are aluminum profiles and/or composite material profiles. In this way, the weight of the transport skid can easily be reduced by 30-40% relative to conventional welded steel skids. A transport skid designed in this manner not only allows for particular flexibility with respect to alteration for further vehicle types, but also, due to the weight saving, makes it possible to take account of the constantly increasing mass of the vehicles, in particular of electric powertrains comprising heavy batteries are installed. In particular when using continuously cast aluminum profiles, particularly good dimensional accuracy can be achieved, and tension or significant tolerances in the material, as can arise for example in the case of steel profiles, can be prevented from the outset.

According to a preferred embodiment of the present invention, it may be possible for one or more metal profile to be screwed together by means of elbow connectors. Using elbow connectors makes it possible in particular to additionally rigidify the transport skid thus constructed, such that the transport skid cannot deform during operation, and a desired dimension can be ensured.

It may furthermore be possible for a starting buffer to be arranged, in particular screwed, on at least one end of the member. The starting buffers can be formed for example from plastics material.

The invention allows for complete modularization of transport skids, such that the individual components of the transport skid can be assembled, in particular screwed together, in a modular manner. The individual modules can for example be made available having different dimensions, in order to be able to modify the transport skid. For example, transverse connectors of different lengths can be kept in stock in order to change the track width of the transport skids as required, and thus use the transport skids in all production regions. Of course, further superstructures, components and profiles can be made available in a modular manner, resulting in a completely flexible system having minimal modification times.

BRIEF DESCRIPTION OF THE DRAWING

The invention will be explained in greater detail in the following, with reference to the embodiments shown in FIG. 1.

FIG. 1 is a perspective view of a transport skid according to the invention, given by way of example.

DETAILED DESCRIPTION OF PREFERRED EMBODIMENTS

The components shown in FIG. 1 do not all have to be provided; only the two longitudinal members 10, 11, functioning as runners and extending in the main longitudinal extension X, as well as at least two elements that interconnect the longitudinal members and can be designed in particular as transverse connectors 21, 25, 28, are obligatory. At least one receptacle 23, 24 for receiving a workpiece is furthermore obligatory. The main longitudinal extension direction of the transverse connectors 21, 25, 28 preferably extends in the transverse direction Y, in particular perpendicularly to the direction X and to the vertical direction Z.

The longitudinal members 10, 11 are connected by means of the screwed-on transverse connectors which, just like the longitudinal members 10, 11, are preferably formed of aluminum profiles or composite material profiles. The structural profiles used may be commercially available. The parallelism of the longitudinal members 10, 11 can be ensured for example by means of cutting to length the structural profiles used, in an exactly fitting manner, by means of CNC (computer numerical control) machines.

The further superstructures 21, 22, 24, 26, 27 of the transport skid 1 likewise preferably comprise structural profiles, in particular which have been cut to length on CNC machines, and which may likewise be formed of aluminum. In order to rigidify the structure, commercially available elbow and screw connectors 30 can be used.

In order to allow for stackability of the transport skid, stacking superstructures 21, 22, in particular stackable crosspieces 21a, 22a, consisting of structural profiles, in particular aluminum profiles or composite material profiles, can be screwed onto the longitudinal members 10, 11. Said stackable superstructures 21, 22 are mutually spaced in the longitudinal direction X. For the purpose of automatic stacking, receiving pockets 21a, 21b can be provided on the stackable superstructures.

The workpiece receptacles 23, 24 comprise receiving portions 23b, 24b which are preferably fastened to a base plate 23c, 24c which is in turn screwed to receptacle crosspieces 23a, 24a. It is thus possible for the receiving portions 23b, 24b to be adjusted steplessly in the directly Y, in a manner transverse to the longitudinal members 10, 11.

The transport skid 1, shown by way of example in FIG. 1, comprises two longitudinal members 10, 11 that are designed as runners and comprise four plastics starting buffers 101, 102, 111, 112 that are screwed on. In this case, the runners are interconnected by means of screwed transverse connectors 21, 25, 28. Stackable crosspieces 21, 22 and vehicle workpiece receptacles 23, 24 comprising receptacle crosspieces 23a, 24a are screwed to the runners 10, 11. In this case, the receiving portions 23b, 24b are screwed to the receiving receptacle crosspieces 23a, 24a, and preferably reinforced, by means of aluminum plates 23c, 24c. In order to rigidify the entire system, elbow connectors 30 are used at the required points. For the purpose of automatic stackability of the transport skid, stackable superstructures 21, 22 consisting of aluminum profiles are screwed to the runners 10, 11 of the transport skid 1. Finally, engagement portions 26, 27 that are spaced apart from one another in the X direction can also be provided on the runners 10, 11, which engagement portions are used for raising the transport skid 1, for example by means of a stacker truck.

The transport skid 1 according to the invention, and the components thereof, are assembled in a modular manner, such that they can be adjusted to changing conditions at any time. Furthermore, when aluminum is used it is possible to achieve a weight reduction of the transport skid 1 of 30-40%, and therefore, accordingly, vehicles that are 30-40% heavier can be conveyed thereon, without the need to adjust the haulways conveying the transport skid 1.

What is claimed is:

1. A transport skid (1) for transporting vehicles or vehicle parts through assembly lines in a transport direction (X), comprising two interconnected longitudinal members (10, 11) that extend such that the main longitudinal extension direction thereof is in parallel with the transport direction (X), the longitudinal members (10, 11) being interconnected by means of transverse connectors (21, 25, 28) that are mutually spaced in the transport direction (X), first receptacles (23, 24) for placing a vehicle or vehicle part being attached to the longitudinal members (10, 11), wherein the longitudinal members (10, 11) and the transverse connectors (21, 25, 28) and the first receptacles (23, 24) comprise structural profiles, wherein the structural profiles of the transverse connectors (21, 25, 28) and of the first receptacles (23, 24) are connected to the structural profiles of longitudinal members (10, 11) by means of a screw connection, whereby the longitudinal members (10, 11), the transverse connectors (21, 25, 28), the first receptacles (23, 24), and structural profiles are assembled in a modular manner by means of the screw connection.

2. The transport skid (1) according to claim 1, further comprising second receptacles (21, 22) that comprise structural profiles for receiving a further transport skid (1), the structural profiles of the second receptacles (21, 22) being connected to the structural profiles of the longitudinal members (10, 11) by means of a screw connection.

3. The transport skid (1) according to claim 2, wherein at least one of the first and/or the second receptacles is foldable relative to the longitudinal members (10, 11).

4. The transport skid (1) according to claim 1, wherein at least one of the structural profiles are selected from the group consisting of aluminum profiles, composite material profiles, and combinations thereof.

5. The transport skid (1) according to claim 4, wherein at least one of the structural profiles are lightweight composite material profiles.

6. The transport skid (1) according to claim 4, wherein all of the structural profiles are selected from the group consisting of aluminum profiles, lightweight composite material profiles, and combinations therefor.

7. The transport skid (1) according to claim 4, wherein all of the structural profiles are lightweight composite material profiles.

8. The transport skid (1) according to claim 1, wherein the structural profiles are screwed together by means of elbow connectors (30).

9. The transport skid (1) according to claim 1, further comprising starting buffers (101, 111, 102, 112) arranged on at least one end of the longitudinal members (10, 11).

10. The transport skid (1) according to claim 1, wherein the starting buffers (101, 111, 102, 112) are screwed on at least one end of the longitudinal members (10, 11).

11. The transport skid (1) according to claim 1, wherein structural profiles are metal profiles or composite material profiles.

12. The transport skid (1) according to claim 1, whereby the structural profiles of the transverse connectors (21, 25, 28) and of the first receptacles (23, 24) are adjustable relative to the structural profiles of longitudinal members (10, 11) by means of the screw connection.

13. A transport skid (1) for transporting vehicles or vehicle parts through assembly lines in a transport direction (X), comprising two interconnected longitudinal members (10, 11) that extend such that the main longitudinal extension direction thereof is in parallel with the transport direction (X), the longitudinal members (10, 11) being interconnected by means of transverse connectors (21, 25, 28) that are mutually spaced in the transport direction (X), first receptacles (23, 24) for placing a vehicle or vehicle part being attached to the longitudinal members (10, 11), wherein the longitudinal members (10, 11) and the transverse connectors (21, 25, 28) and the first receptacles (23, 24) comprise structural profiles, wherein the structural profiles of the transverse connectors (21, 25, 28) and of the first receptacles (23, 24) are connected to the structural profiles of longitudinal members (10, 11) by means of a screw connection, whereby the structural profiles of the transverse connectors (21, 25, 28) and of the first receptacles (23, 24) are adjustable relative to the structural profiles of longitudinal members (10, 11) by means of the screw connection.

14. The transport skid (1) according to claim 13, further comprising second receptacles (21, 22) that comprise structural profiles for receiving a further transport skid (1), the structural profiles of the second receptacles (21, 22) being connected to the structural profiles of the longitudinal members (10, 11) by means of a screw connection.

15. The transport skid (1) according to claim 14, wherein at least one of the first and/or the second receptacles is foldable relative to the longitudinal members (10, 11).

16. The transport skid (1) according to claim 13, wherein at least one of the structural profiles are selected from the group consisting of aluminum profiles, composite material profiles, and combinations thereof.

17. The transport skid (1) according to claim 16, wherein at least one of the structural profiles are lightweight composite material profiles.

18. The transport skid (1) according to claim 16, wherein all of the structural profiles are selected from the group consisting of aluminum profiles, lightweight composite material profiles, and combinations thereof.

19. The transport skid (1) according to claim 16, wherein all of the structural profiles are lightweight composite material profiles.

20. The transport skid (1) according to claim 13, wherein the structural profiles are screwed together by means of elbow connectors (30).

21. The transport skid (1) according to claim 13, further comprising starting buffers (101, 111, 102, 112) arranged on at least one end of the longitudinal members (10, 11).

22. The transport skid (1) according to claim 13, wherein the starting buffers (101, 111, 102, 112) are screwed on at least one end of the longitudinal members (10, 11).

23. The transport skid (1) according to claim 13, wherein the structural profiles are selected from the group consisting of metal profiles, composite material profiles, and combinations thereof.

24. The transport skid (1) according to claim 13, whereby the longitudinal members (10, 11), the transverse connectors (21, 25, 28), the first receptacles (23, 24), and structural profiles are assembled in a modular manner by means of the screw connection.

25. A transport skid (1) for transporting vehicles or vehicle parts through assembly lines in a transport direction (X), comprising two interconnected longitudinal members (10, 11) that extend such that the main longitudinal extension direction thereof is in parallel with the transport direction (X), the longitudinal members (10, 11) being interconnected by means of transverse connectors (21, 25, 28) that are mutually spaced in the transport direction (X), first receptacles (23, 24) for placing a vehicle or vehicle part being attached to the longitudinal members (10, 11), wherein the longitudinal members (10, 11) and the transverse connectors (21, 25, 28) and the first receptacles (23, 24) comprise structural profiles, wherein the structural profiles of the transverse connectors (21, 25, 28) and of the first receptacles (23, 24) are connected to the structural profiles of longitudinal members (10, 11) by means of a screw connection, whereby the longitudinal members (10, 11), the transverse connectors (21, 25, 28), the first receptacles (23, 24), and structural profiles are assembled in a modular manner by means of the screw connection, whereby the structural profiles of the transverse connectors (21, 25, 28) and of the first receptacles (23, 24) are adjustable relative to the structural profiles of longitudinal members (10, 11) by means of the screw connection.

26. The transport skid (1) according to claim 25, further comprising second receptacles (21, 22) that comprise structural profiles for receiving a further transport skid (1), the structural profiles of the second receptacles (21, 22) being connected to the structural profiles of the longitudinal members (10, 11) by means of a screw connection.

27. The transport skid (1) according to claim 26, wherein at least one of the first and/or the second receptacles is foldable relative to the longitudinal members (10, 11).

28. The transport skid (1) according to claim 25, wherein at least one of the structural profiles are selected from the group consisting of aluminum profiles, composite material profiles, and combinations thereof.

29. The transport skid (1) according to claim 28, wherein at least one of the structural profiles are composite material profiles.

30. The transport skid (1) according to claim 28, wherein all of the structural profiles are selected from the group consisting of aluminum profiles, composite material profiles, and combinations thereof.

31. The transport skid (1) according to claim 28, wherein all of the structural profiles are composite material profiles.

32. The transport skid (1) according to claim 25, wherein the structural profiles are screwed together by means of elbow connectors (30).

33. The transport skid (1) according to claim 25, further comprising starting buffers (101, 111, 102, 112) arranged on at least one end of the longitudinal members (10, 11).

34. The transport skid (1) according to claim 25, wherein the starting buffers (101, 111, 102, 112) are screwed on at least one end of the longitudinal members (10, 11).

35. The transport skid (1) according to claim 25, wherein the structural profiles are selected from the group consisting of metal profiles, composite material profiles, and combinations thereof.

* * * * *